United States Patent Office 3,349,770
Patented Oct. 31, 1967

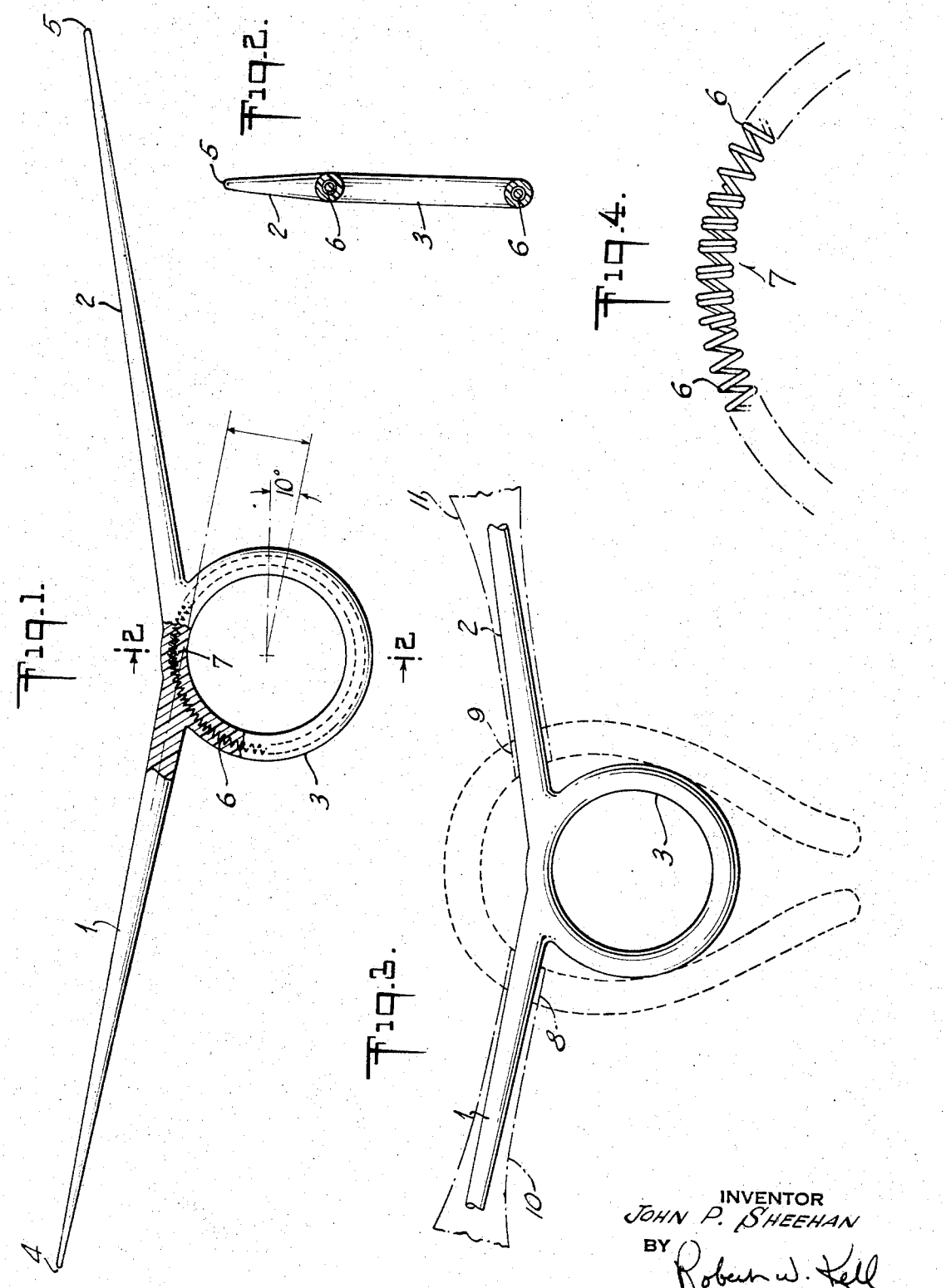

3,349,770
PLASTIC PROSTHESIS USEFUL IN
GYNAECOLOGICAL SURGERY
John P. Sheehan, Somerville, N.J., assignor to Ethicon,
Inc., a corporation of New Jersey
Filed June 3, 1964, Ser. No. 372,158
2 Claims. (Cl. 128—303)

ABSTRACT OF THE DISCLOSURE

A prosthetic device useful in the surgical repair of Fallopian tubes is molded in the form of a ring having a circular coiled spring embedded therein. Molded integrally with the ring are two rods that extend tangent from the circumference in the plane of the ring and diverge slightly from the ring to their extremities.

---

This invention relates to an internal splint useful in gynaecological surgery and more particularly to a device designed to prevent postoperative occulsion of the tubal lumen following a tuboplasty operation.

Tuboplasty is a technique in gynaecological surgery whereby diseased Fallopian tubes may be repaired. Following the publication of collected statistics by Greenhill and Hellman on the end results of tuboplasty, many surgeons had the impression that these operations were of little practical value. In approximately 50% of the cases occlusion occurred and even in those cases when tubal patency was restored pregnancy occurred in only a small number of the patients.

It is an object of the present invention to make available to the surgeon an internal splint whereby the cornual end of the implanted tubes can be kept open until the surgical repair has healed.

Another object of the present invention is to provide an internal splint that will not shift in position within the body until the surgeon desires to remove it.

The construction and use of the internal splint of the present invention will be best understood with reference to the accompanying drawings in which:

FIGURE 1 is a plan view partly in section of an internal splint.

FIG. 2 is a sectional view along the line 2—2 of FIG. 1.

FIG. 3 is a diagrammatic view of the internal splint showing the position of the splint in the uterus following tuboplasty.

FIG. 4 is an enlarged view of a coil spring and illustrates the manner in which the ends of the spring are joined.

The splint illustrated in FIG. 1 is generally symmetrical and comprises flexible elongated rodlike members 1 and 2 which may be circular in cross-section and are about 8 inches in length. The rods are preferably molded of a plastic material such as a silicone. A silicone plastic is an organosilicon oxide polymer in which the structural unit is usually —R$_2$Si—O— where R is a mono-valent organic radical. A suitable silicone for use in the present invention is "Silastic" manufactured by the Dow Chemical Company of Midland, Mich. Formed integral with the rods is a ring 3 positioned centrally approximately equidistant from the ends 4 and 5 of the rods. This ring is about one inch in diameter. The rods are provided with a slight conical taper from the ring 3 to their ends 4 and 5, the diameter increasing uniformly from about 0.045 inch at the ends to about 0.10 inch at the ring. The plastic rods lie in the plane of the ring but are preferably slightly divergent as illustrated in FIG. 1. This shape facilitates positioning the splint within the uterus.

The internal splint of the present invention is an improvement over that described and claimed in copending application Ser. No. 212,382, filed July 25, 1962, now Patent No. 3,182,662, in that the ring 3 is reinforced with a circular coil spring 6. The coil spring may be conveniently formed by abutting the ends of a spring having the proper length and twisting the ends in opposite directions to join them. The joined portion of the spring is illustrated by FIG. 4. This spring is molded in position so that it is centrally located within the ring 3 and surrounded on all sides by plastic material. Preferably, the joined section 7 of the spring is placed at the junction of the rods 1 and 2 with the ring 3.

In using the internal splint of the present invention, the surgeon first makes two cornual openings 8 and 9 in the uterus. The rod 2 of the tubal splint is then passed through the cornual openings 8 and 9 and the ring 3 is manually compressed and pushed into the uterine cavity through the opening 8 so that the two lateral rods project through the walls of the uterus, as illustrated in FIG. 3. The segments of the Fallopian tubes 10 and 11 to be implanted are then slipped over the laterally extending arms of the splint and sutured to the uterus to close the openings 8 and 9.

It is an important advantage of the internal splint described above that the ring portion is flexible and may be easily deformed by the surgeon for insertion into the uterus as shown in FIG. 4 thereby holding the splint securely in place. The central ring 3 prevents the internal splint from sliding sideways and since it is in the uterine cavity, it can be kept in for many months to prevent the implantation site from contracting and causing occlusion. The splint may be removed from the uterus four to six months following surgery. The flexibility of the spring 6 permits removal of the internal splint through the cervix.

What is claimed is:

1. An internal splint useful in preventing post-operative occlusion of the tubal lumen following a tuboplasty operation comprising a circular coil spring embedded in a molded plastic material to form a flexible ring, and two rods molded of a form retaining plastic material integral with said ring and tangent to its circumference, the ends of said rod being positioned in the plane of the ring and diverging slightly from the ring to their extremities.

2. The internal splint of claim 1, wherein said plastic material is an organosilicon oxide polymer.

References Cited
UNITED STATES PATENTS

| | | | |
|---|---|---|---|
| 2,111,313 | 3/1938 | Clark | 128—127 |
| 3,182,662 | 5/1965 | Shirodkar | 128—303 |

OTHER REFERENCES

Silicones—1959, authors R. N. Meals and F. M. Lewis, p. 222 relied upon.

RICHARD A. GAUDET, *Primary Examiner.*

G. E. McNEILL, *Assistant Examiner.*